United States Patent
Kinomoto

(10) Patent No.: US 9,654,336 B2
(45) Date of Patent: May 16, 2017

(54) INFORMATION PROCESSING APPARATUS HAVING A FUNCTION OF SUPPORTING ACCESS TO MANAGING APPARATUSES, INFORMATION PROCESSING SYSTEM, AND METHOD OF PROCESSING INFORMATION

(71) Applicant: Tsutomu Kinomoto, Kanagawa (JP)

(72) Inventor: Tsutomu Kinomoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 317 days.

(21) Appl. No.: 14/063,004

(22) Filed: Oct. 25, 2013

(65) Prior Publication Data
US 2014/0143399 A1 May 22, 2014

(30) Foreign Application Priority Data

Nov. 20, 2012 (JP) .................... 2012-254221

(51) Int. Cl.
*H04L 12/24* (2006.01)
*H04L 29/06* (2006.01)
*G06F 11/07* (2006.01)

(52) U.S. Cl.
CPC ........ *H04L 41/042* (2013.01); *G06F 11/0733* (2013.01); *G06F 11/0784* (2013.01); *H04L 63/029* (2013.01)

(58) Field of Classification Search
CPC ............. G06F 11/0733; G06F 11/0784; H04L 41/042; H04L 63/029
USPC ................................................ 709/223, 224
See application file for complete search history.

(56) References Cited

U.S. PATENT DOCUMENTS

| | | | | |
|---|---|---|---|---|
| 6,049,827 A | * | 4/2000 | Sugauchi | H04L 41/22 709/219 |
| 7,627,660 B2 | * | 12/2009 | Naitoh | G06Q 10/087 235/385 |
| 7,831,687 B2 | * | 11/2010 | Kano | G06F 3/0622 709/217 |
| 8,027,051 B2 | * | 9/2011 | Hozumi | G06F 11/0733 358/1.14 |

(Continued)

FOREIGN PATENT DOCUMENTS

| | | |
|---|---|---|
| JP | 2002-198961 | 7/2002 |
| JP | 2009-164753 | 7/2009 |

OTHER PUBLICATIONS

Japanese Office Action dated Aug. 2, 2016.

*Primary Examiner* — Alina N Boutah
(74) *Attorney, Agent, or Firm* — IPUSA, PLLC

(57) ABSTRACT

A disclosed information processing apparatus connected to a managing apparatus, which manages apparatus information of an electronic apparatus, through a network includes a receiving part that receives an operation request requesting to operate the apparatus information; a determining part that determines the managing apparatus that manages the apparatus information to be operated based on corresponding information between identification information of the apparatus information to be operated and the managing apparatus upon a receipt of the operation request; and a requesting part that generates another operation request of the apparatus information corresponding to the operation request to the managing apparatus determined by the determining part.

8 Claims, 12 Drawing Sheets

(56) References Cited

U.S. PATENT DOCUMENTS

| | | | |
|---|---|---|---|
| 8,239,508 B2* | 8/2012 | Iwami | G06F 17/30044 709/223 |
| 9,019,123 B2* | 4/2015 | Boulanger | H04Q 9/00 340/870.03 |
| 2002/0083161 A1 | 6/2002 | Miyauchi | |
| 2003/0097454 A1* | 5/2003 | Yamakawa | H04L 29/12018 709/229 |
| 2003/0177261 A1* | 9/2003 | Sekiguchi | G06F 3/0611 709/238 |
| 2004/0088142 A1* | 5/2004 | Ashley | H04L 41/0253 702/184 |
| 2004/0186694 A1* | 9/2004 | Oya | G03G 15/5075 702/188 |
| 2005/0177646 A1* | 8/2005 | Kawano | H04L 29/12009 709/245 |
| 2006/0031777 A1* | 2/2006 | Motoyama | G06Q 10/10 715/779 |
| 2006/0041614 A1* | 2/2006 | Oe | G06F 3/0611 709/203 |
| 2008/0059472 A1* | 3/2008 | Yamamoto | G06F 17/30011 |
| 2009/0055524 A1* | 2/2009 | Tokunaga | G06Q 10/02 709/224 |
| 2010/0076933 A1* | 3/2010 | Hamilton | G06F 3/0604 707/640 |
| 2011/0093554 A1* | 4/2011 | Shin | H04L 67/18 709/207 |
| 2012/0089474 A1* | 4/2012 | Xiao | G06Q 10/06311 705/26.4 |
| 2012/0151058 A1* | 6/2012 | Lee | H04L 12/2834 709/225 |
| 2012/0215747 A1* | 8/2012 | Wang | H04L 67/2852 707/690 |
| 2013/0246600 A1* | 9/2013 | Ohnishi | H04L 41/50 709/223 |
| 2014/0085061 A1* | 3/2014 | Shimizu | H04M 1/72533 340/12.5 |

* cited by examiner

FIG.7

| CLIENT ID | NAME | ADDRESS | TELEPHONE NUMBER | MAIL ADDRESS | ... |
|---|---|---|---|---|---|
| 001 | ... | ... | ... | ... | ... |
| 002 | ... | ... | ... | ... | ... |
| .. | .. | .. | .. | .. | .. |

| ADDRESS KEYWORD | LONG-DISTANCE CODE KEYWORD | DATA CENTER NAME | ADDRESS INFORMATION |
|---|---|---|---|
| METROPOLIS OF TOKYO, CHIBA PREFECTURE, SAITAMA PREFECTURE, KANAGAWA PREFECTURE | 03, 04, 0274, 044, 042, ········ | SHINAGAWA DATA CENTER | https://www.shinagawa.datacenter.jp/ |
| HOKKAIDOU, AOMORI PREFECTURE | 01, 0123, 017, ········ | TOUHOKU DATA CENTER | https://www.tohoku.datacenter.jp/ |
| OSAKA PREFECTURE | 06, 0729, ········ | OSAKA DATA CENTER | https://www.osaka.datacenter.jp/ |

FIG.9

| CLIENT ID | APPARATUS ID | APPARATUS INFORMATION |
|---|---|---|
| 001 | xxxx | .... |
| 002 | yyyy | .... |
| : | : | : |

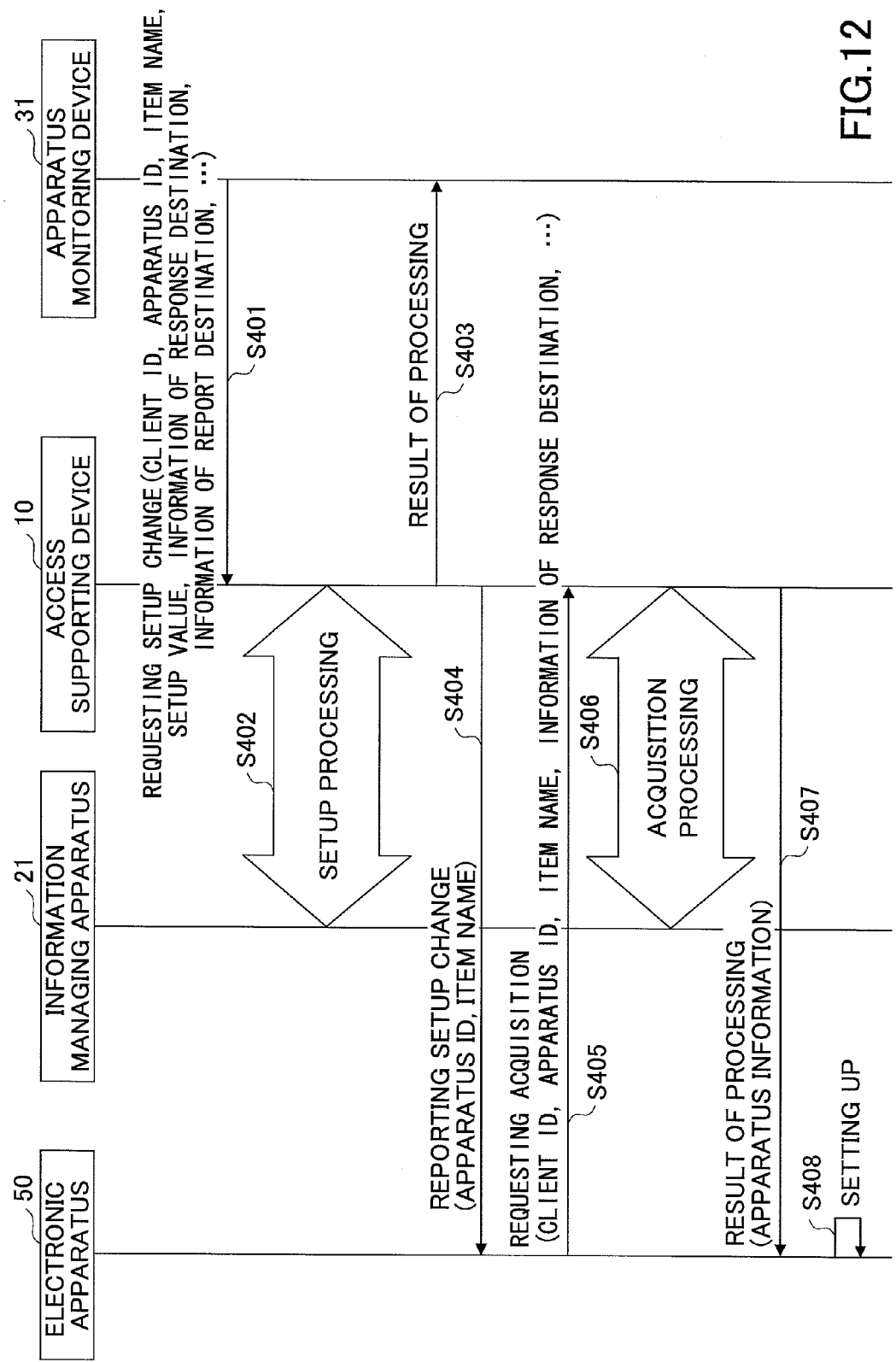

INFORMATION PROCESSING APPARATUS HAVING A FUNCTION OF SUPPORTING ACCESS TO MANAGING APPARATUSES, INFORMATION PROCESSING SYSTEM, AND METHOD OF PROCESSING INFORMATION

BACKGROUND OF THE INVENTION

1. Field of the Invention

The present invention generally relates to an information processing apparatus, an information processing system, and a method of processing information.

2. Description of the Related Art

An example of a remote monitoring system remotely monitors an apparatus such as an image forming apparatus, which is installed in a client environment such as an office, through a wide area network (WAN) such as the Internet. According to Patent Document 1, information of an apparatus is sent to a remote monitoring system, and the remote monitoring system judges a state of the apparatus such as an occurrence of a defect based on the information of the apparatus.

Patent Document 1: Japanese Laid-Open Patent Application No. 2009-164753

Conventionally, there is a difficulty for a serviceman of accessing a client's apparatus from the outside of a client environment and checking the state of the client's apparatus when a defect or the like occurs. The difficulty occurs because there is a client who does not allow an access from the outside, a client environment which has a firewall to prevent the access from the outside, or the like from a point of view of security.

Therefore, in order to enable remote monitoring, information of apparatuses in a client environment may be uploaded to a data center and managed in the data center. In this case, the serviceman can refer to the information of the apparatus and check the state of the apparatus by accessing the data center.

However, each client does not always use the same data center. For example, a data center convenient for a user may differ depending on a location where the client exists. Then, the serviceman should check a data center where information is managed for each client and change to this data center as an access destination. As a result, a working efficiency for the serviceman may be lowered.

SUMMARY OF THE INVENTION

Accordingly, embodiments of the present invention provide a novel and useful information processing apparatus and an information processing system solving one or more of the problems discussed above.

One aspect of the embodiments of the present invention may be to provide an information processing apparatus connected to a managing apparatus, which manages apparatus information of an electronic apparatus, through a network includes a receiving part that receives an operation request requesting to operate the apparatus information; a determining part that determines the managing apparatus that manages the apparatus information to be operated based on corresponding information between identification information of the apparatus information to be operated and the managing apparatus upon a receipt of the operation request; and a requesting part that generates another operation request of the apparatus information corresponding to the operation request to the managing apparatus determined by the determining part.

Objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 7 illustrates an exemplary configuration of a client information storing part;

FIG. 8 illustrates an exemplary configuration of an access destination information storing part;

FIG. 9 illustrates an exemplary management mode of apparatus information in an information managing apparatus;

FIG. 12 is a sequence diagram for explaining an exemplary processing procedure for remotely changing a setup of apparatus information of an electronic apparatus.

DETAILED DESCRIPTION OF THE PREFERRED EMBODIMENTS

A description is given below, with reference to FIG. 1 through FIG. 12 of embodiment of the present invention. Where the same reference symbols are attached to the same parts, repeated description of the parts is omitted.

REFERENCE SYMBOLS TYPICALLY DESIGNATE AS FOLLOWS

1: apparatus monitoring system;
10: access supporting device;
11: access support controlling part;
12: information managing part;

13: reporting part;
14: client information storing part;
15: access destination information storing part;
20: data center;
21: information managing apparatus;
31: apparatus monitoring device;
30: apparatus supporting center;
40: serviceman terminal;
50: electronic apparatus;
50a: multifunction peripheral;
50b: printer;
50c: projector;
50d: digital camera;
50e: multifunction peripheral;
50f: printer;
50g: projector;
50i: projector;
50j: digital camera;
51: access requesting part;
52: apparatus controlling part;
60: apparatus managing apparatus;
100: drive device;
101: recording medium;
102: auxiliary memory device;
103: memory device;
104: CPU;
105: interface device;
111: request receiving part;
112: access part;
113: request sending part;
B: bus;
E1: client environment;
E2: client environment; and
E3: client environment.

Figure 1:
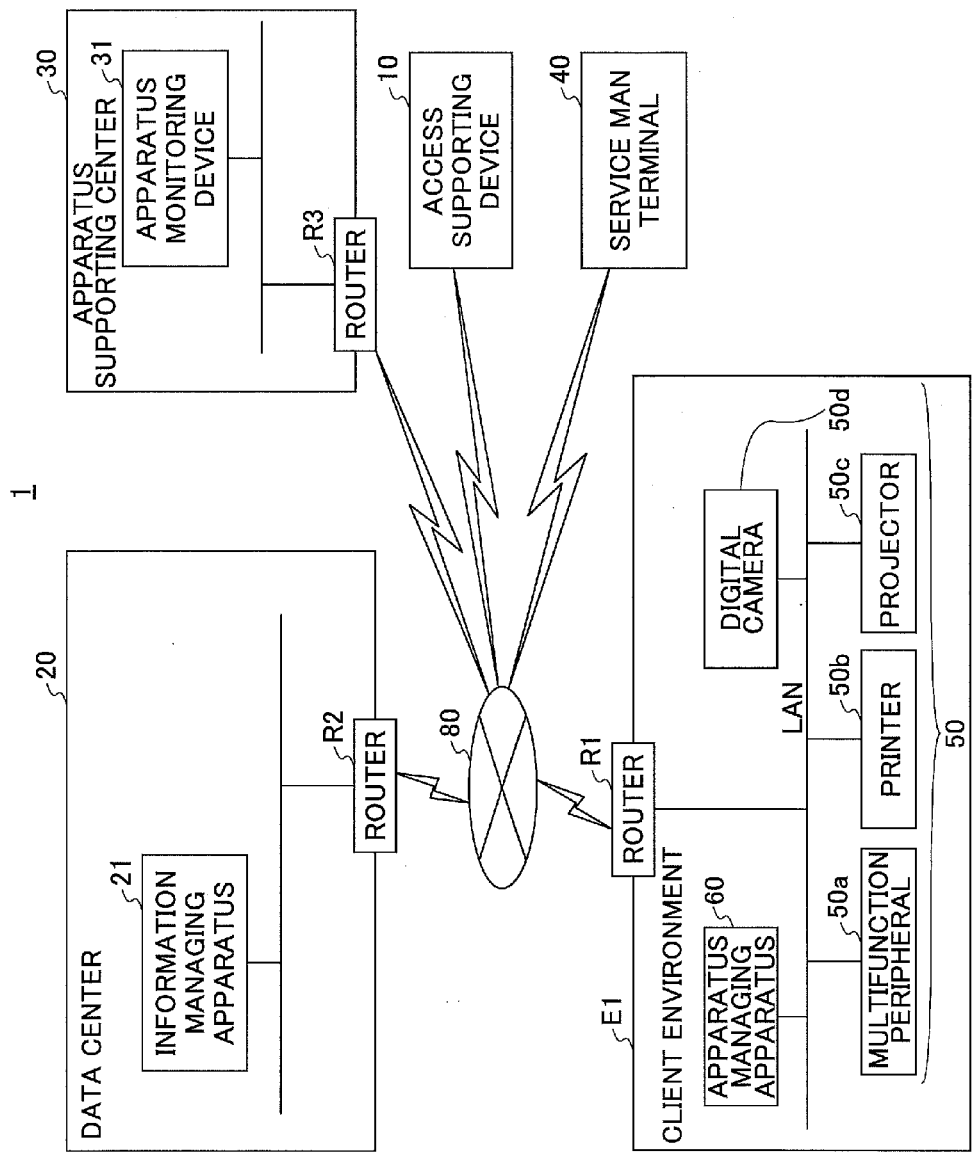
FIG. 1 illustrates an exemplary network configuration of an apparatus monitoring system of an embodiment of the present invention.

Hereinafter, the embodiment of the present invention is described based on the figures. FIG. 1 illustrates an exemplary network configuration of an apparatus monitoring system of an embodiment.

The apparatus monitoring system 1 illustrated in FIG. 1 includes a client environment E1, a data center 20, an apparatus supporting center 30, a serviceman terminal 40, an access supporting device 10, or the like. These are mutually communicable through a wide area network (WAN) 80 such as the Internet.

Figure 5:
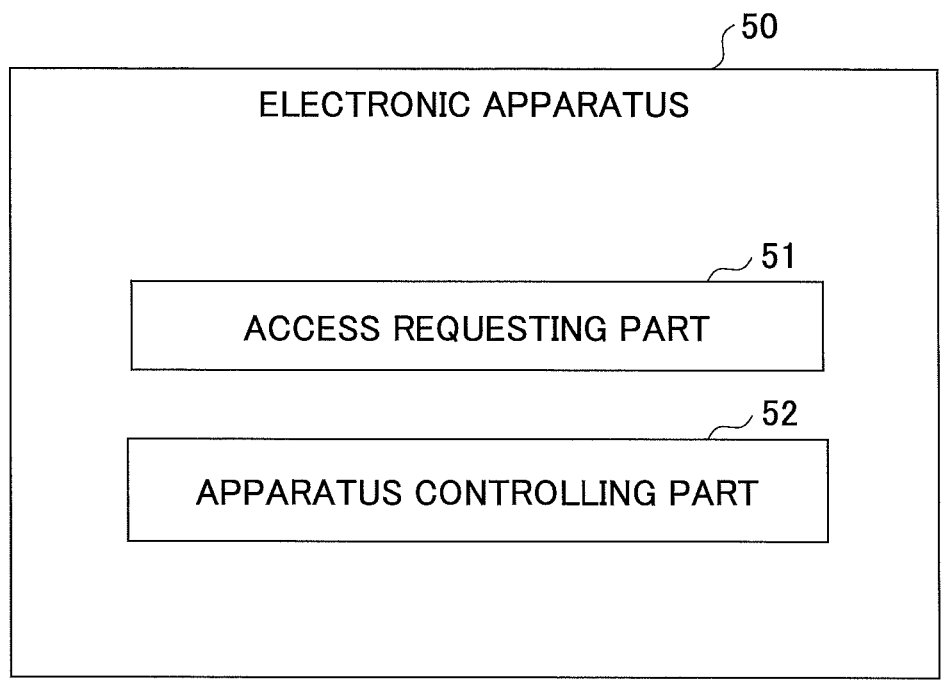
FIG. 5 illustrates an exemplary functional configuration of an electronic apparatus of the embodiment of the present invention.

The client environment E1 is a system environment of a user of the electronic apparatus 50 (as illustrated in FIG. 5). In the client environment E1 illustrated in FIG. 1, a multifunction peripheral 50a, a printer 50b, a projector 50c, a digital camera 50d, an apparatus managing apparatus 60, or the like are connected through a network (wired or wireless) such as a local area network (LAN).

The multifunction peripheral 50a, the printer 50b, the projector 50c, and the digital camera 50d are examples of the electronic apparatus 50. An electronic apparatus 50 other than these may be included in the client environment E1.

The apparatus managing apparatus 60 is a computer such as a personal computer (PC) in the client environment E1. The apparatus managing apparatus 60 collects information of the electronic apparatus 50 (hereinafter, referred to as "apparatus information", and performs a process for uploading the collected apparatus information to the data center 20. Said differently, the apparatus managing apparatus 60 can be connected to the WAN 80 through the router R1. The apparatus information includes, for example, attribute information of the electronic apparatus 50, setup information of the electronic apparatus 50, information indicative of a state of the electronic apparatus 50, or the like. The attribute information of the electronic apparatus 50 includes, for example, identification information (hereinafter, referred to as an "apparatus ID") of the body of the electronic apparatus 50, a model name of the electronic apparatus 50, or the like. The setup information may include not only a value related to a setup item but also a program itself installed in the apparatus or the like.

The apparatus information may include the whole content of a memory device such as a hard disk drive (HDD) included in the electronic apparatus 50. Said differently, a copy of the content in the memory device of the electronic apparatus 50 may be stored in the information managing apparatus 21.

Although only one client environment E1 is illustrated in FIG. 1, a plurality of client environments may exist. Further, the single client environment may be a company or the like or a department or the like in the company.

The data center 20 includes an information managing apparatus 21 or the like. The information managing apparatus 21 can be connected to the WAN 80 through the router R2.

The information managing apparatus 21 is an apparatus or a system including a memory part that stores the apparatus information that is uploaded from the client environment E1, and a control part that performs various operations for the stored information. The information managing apparatus 21 may be formed by a plurality of apparatuses. When the information managing apparatus 21 stores apparatus information, the information managing apparatus 21 virtually reproduces the electronic apparatus 50 in the client environment E1. Therefore, if somebody wishes to know apparatus information of a certain one of the electronic apparatuses 50 in the client environment E1, it is possible for the user to get apparatus information by accessing the information managing apparatus 21 without accessing the apparatus managing apparatus 60 and the electronic apparatus 50 in the client environment E1.

Although the number of the data centers is one in FIG. 1, the number of the data centers 20 may be plural.

The apparatus supporting center 30 provides a support service using remote monitoring for the electronic apparatus 50 for which a support contract is concluded. The apparatus supporting center 30 includes an apparatus monitoring device 31 or the like. The apparatus monitoring device 31 can be connected to the WAN 80 through the router R3. The apparatus monitoring device 31 refers to the apparatus information stored in the information managing apparatus 21 thereby obtaining the state of the electronic apparatus 50. When the apparatus monitoring device 31 detects a defect of the electronic apparatus 50, the apparatus monitoring device 31 reports an occurrence of the defect to, for example, a serviceman terminal 40 used by the serviceman. The apparatus monitoring device 31 may be formed by a plurality of computers.

The serviceman terminal 40 is an information processing apparatus used by the serviceman belonging to the apparatus supporting center 30. An example of the serviceman terminal 40 is a smartphone, a tablet-type terminal, a portable phone, a personal computer (PC), or the like. The serviceman can refer to the apparatus information stored in the information managing apparatus 21 using the serviceman terminal 40.

The access supporting device 10 supports the apparatus managing apparatus 60 or the electronic apparatus 50 in the client environment E1, the apparatus monitoring device 31, the serviceman terminal 40, or the like so that the apparatus managing apparatus 60 or the electronic apparatus 50 in the client environment E1, the apparatus monitoring device 31, the serviceman terminal 40, or the like can access the apparatus information stored in the information managing apparatus 21. The access to the apparatus information is included in an operation of the apparatus information. Types of the operation of the apparatus information can be classified roughly to an acquisition and a setup. The acquisition is the operation performed at a time of referring to the apparatus information. The setup is an operation performed at a time of uploading the apparatus information. The apparatus information to be set up is stored in the information managing apparatus 21.

The support for accessing the apparatus information can be called mediation in accessing the apparatus information. Said differently, the access supporting device 10 judges whether the information managing apparatus 21 stores the apparatus information of an access object and determines the information managing apparatus 21 as the access destination. Therefore, a source of requesting an access to the apparatus information can access the apparatus information without considering which data center 20 such as data centers 20a and 20b (the information managing apparatus 21 such as information managing apparatuses 21a and 21b) (see FIG. 2) stores the apparatus information.

Figure 2:
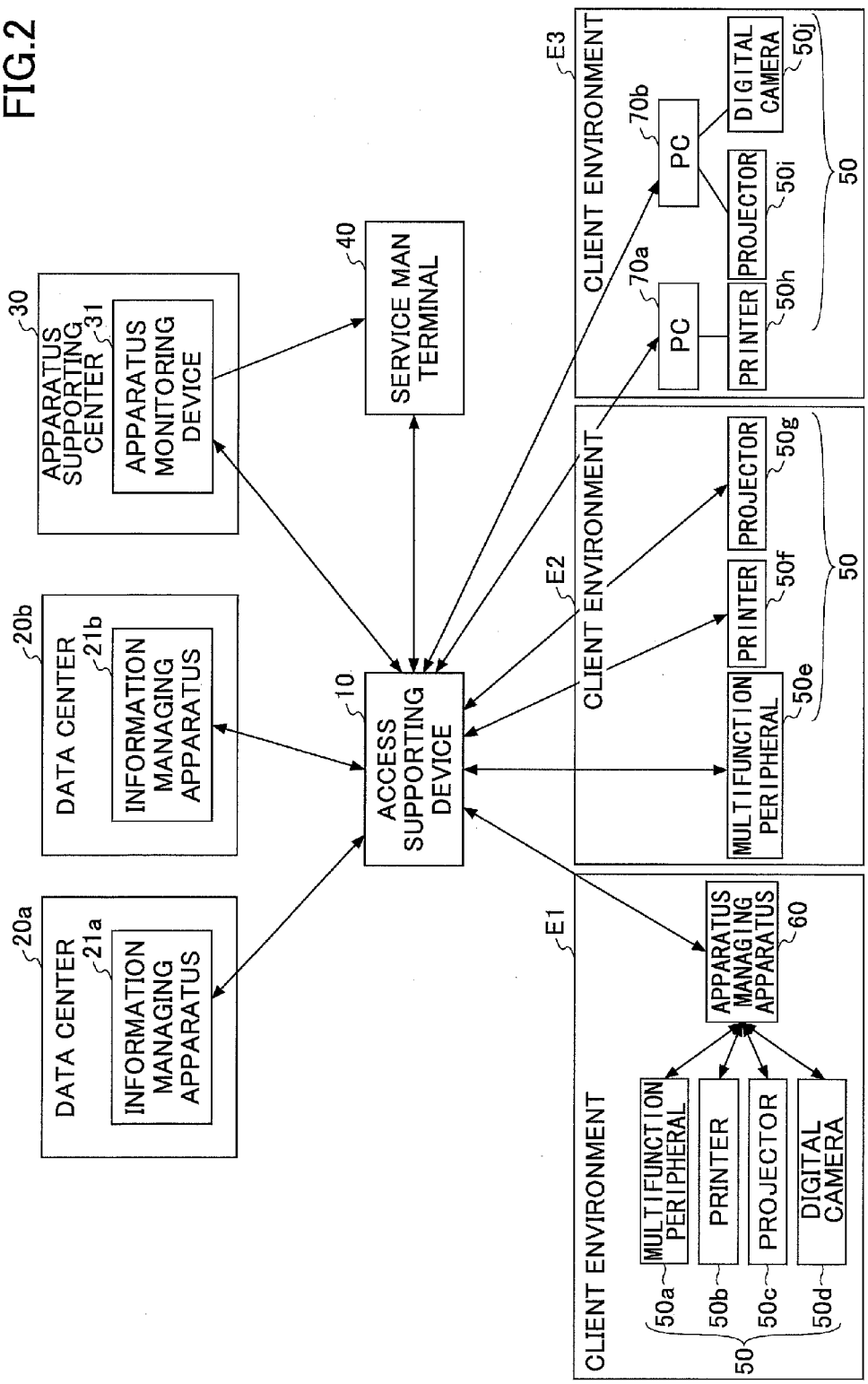
FIG. 2 illustrates an exemplary logical configuration of an apparatus monitoring system of the embodiment of the present invention.

FIG. 2 illustrates an exemplary logical configuration of an apparatus monitoring system of the embodiment. FIG. 2 illustrates two data centers 20a and 20b. For example, the data center 20a corresponds to the data center 20 existing in Tokyo, and the data center 20b corresponds to the data center 20 existing in Osaka. The apparatus information is managed in a plurality of data centers 20 because, for example, different data centers 20 are used by different clients, or one client uses different data centers 20 in case of a disaster.

FIG. 2 illustrates that accesses to the data center 20a or 20b are mediated by the access supporting device 10.

For example, the apparatus information of the multifunction peripheral 50a, the printer 50b, the projector 50c, and the digital camera 50d in the client environment E1 is collected by the apparatus managing apparatus 60. The apparatus managing apparatus 60 requests the access supporting device 10 to upload (set up) the collected apparatus information. The access supporting device 10 sets up the apparatus information to the information managing apparatus 21a of the data center 20a and the information managing apparatus 21b of the data center 20b corresponding to the client environment E1.

The apparatus monitoring device 31 requests an acquisition of and a setup of the apparatus information to the access supporting device 10 when the acquisition of and the setup of the apparatus information of the electronic apparatus 50 (50a to 50j) corresponding to the client environment E1, E2, or E3 is acquired by the apparatus monitoring device 31 or set up by the access supporting device 10. The access supporting device 10 selects the information managing apparatus 21a of the data center 20a or the information managing apparatus 21b of the data center 20b corresponding to the client environment E1, E2, or E3 as a destination from which the apparatus information is acquired or a destination to which the apparatus information is set up. The set up of the apparatus information from the apparatus monitoring device 31 is performed in a case where the setup information of the electronic apparatus 50 is remotely changed to be set up in response to a request from the user. The setup of the apparatus information changed in the information managing apparatus 21 is reflected, by the access supporting device 10, to the electronic apparatus 50 related to the apparatus information.

The serviceman terminal 40 requests an acquisition of the apparatus information of the electronic apparatus 50 in a certain client environment E1 when the apparatus information is acquired by the serviceman terminal 40 from the access supporting device 10. The access supporting device 10 selects the information managing apparatus 21a of the data center 20a or the information managing apparatus 21b of the data center 20b as a destination from which the apparatus information is acquired or a destination to which the apparatus information is set up.

Referring to FIG. 2, client environments E2 and E3 omitted in FIG. 1 are illustrated. The client environment E2 is an example of a client environment, in which an apparatus managing apparatus 60 is not included. In the client environment E2, a multifunction peripheral 50e, a printer 50f, a projector 50g, or the like as examples of the electronic apparatus 50 performs an upload of each apparatus information of the multifunction peripheral 50e, the printer 50f, the projector 50g. Said differently, the apparatus information is uploaded directly by each electronic apparatus 50.

The client environment E3 is an example where the electronic apparatus 50 is not connected to a LAN. For example, the electronic apparatuses 50 are connected to a PC 70a or a PC 70b, which is connectable to the WAN 80, through a universal serial bus (USB) cable. Referring to FIG. 2, a printer 50h is connected to the PC 70a. A projector 50i and a digital camera 50j are connected to the PC 70b. The PC 70a and the PC 70b upload the apparatus information of the electronic apparatuses 50 which are connected to the PC 70a and the PC 70b such as the printer 50h, the projector 50i, and the digital camera 50j, respectively.

The access supporting device 10 sets up the apparatus information, which is uploaded from the client environments E2 and E3, to the information managing apparatus 21a of the data center 20a and the information managing apparatus 21b of the data center 20b corresponding to the client environments.

Figure 3:
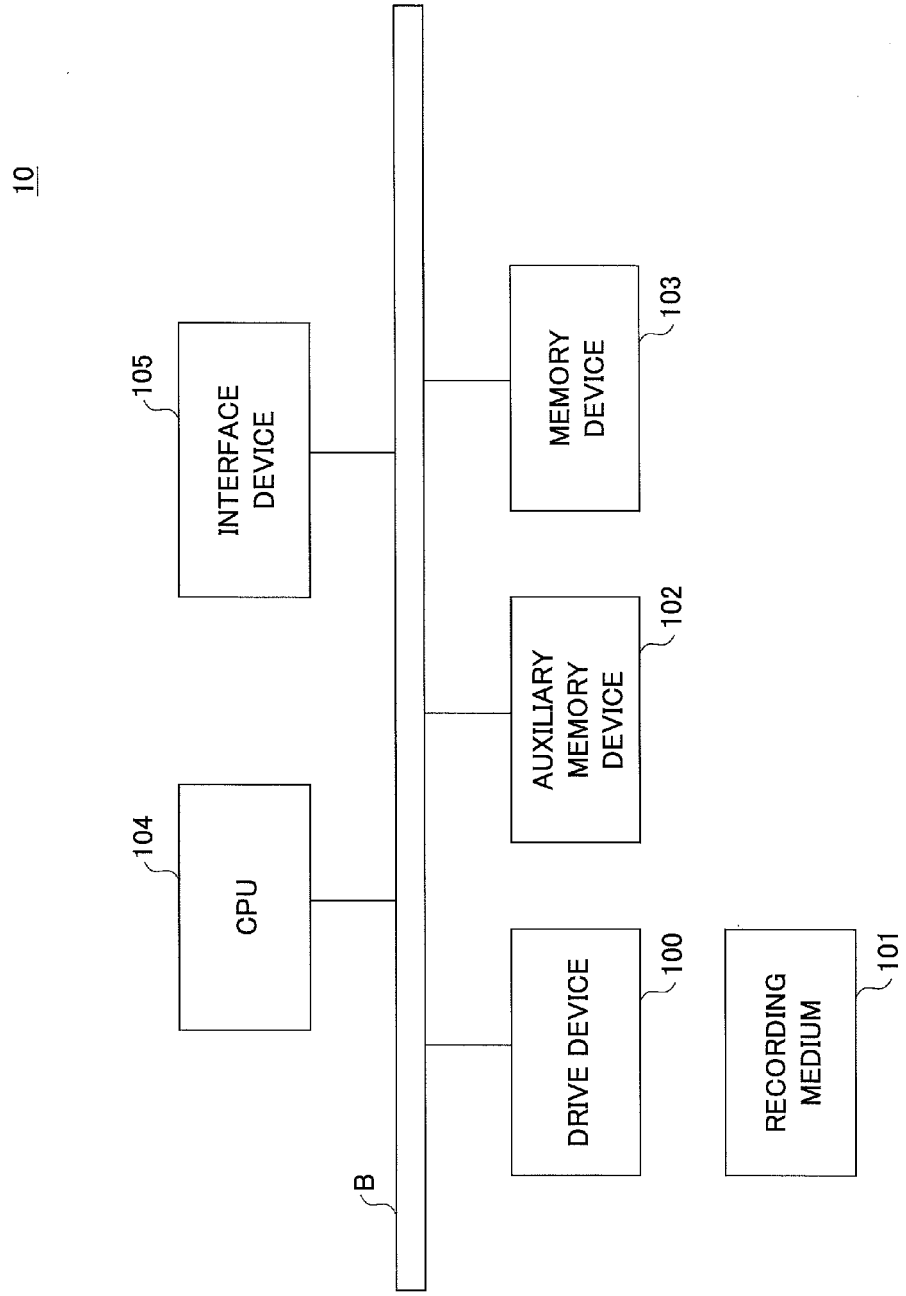
FIG. 3 illustrates an exemplary hardware configuration of an access supporting device of the embodiment of the present invention.

FIG. 3 illustrates an exemplary hardware configuration of an access supporting device 10 of the embodiment of the present invention. The access supporting device 10 illustrated in FIG. 3 includes a drive device 100, an auxiliary memory device 102, a memory device 103, a CPU 104 and an interface device 105, or the like, which are mutually connected.

A program substantializing processes in the access supporting device 10 is supplied by a recording medium 101 such as CD-ROM. When the recording medium 101 with the program recorded is installed in the drive device 100, the program is installed into the auxiliary memory device 102 through the drive device 100 from the recording medium 101. However, the program may not always be installed from the recording medium 101 and may be downloaded from another computer through the network. The auxiliary memory device 102 stores necessary files, data and so on in addition to the installed program.

The memory device 103 reads out the program from the auxiliary memory device 102 when the program is instructed to be invoked and stores the read program in the memory device 103. The CPU 104 executes a function related to the access supporting device 10 in conformity with the program stored in the memory device 103. The interface device 105 is used as an interface for connecting to the network.

Figure 4:
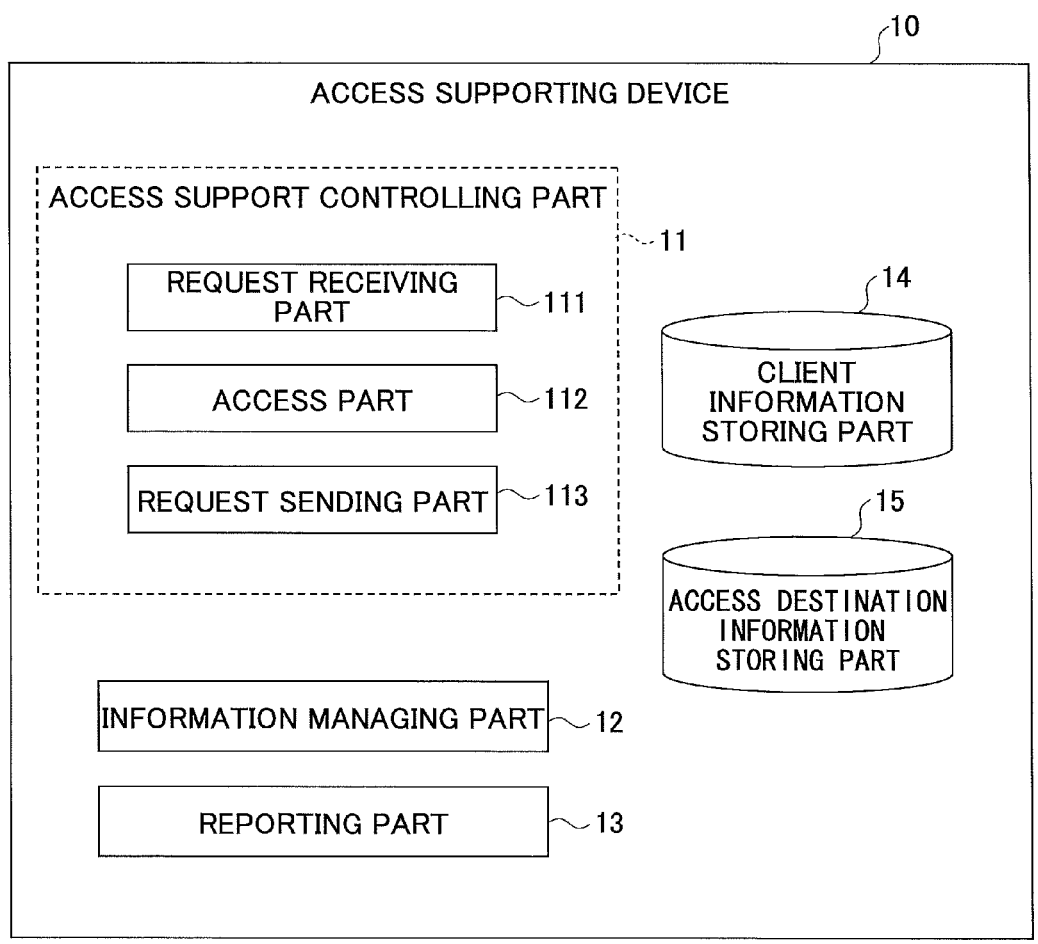
FIG. 4 illustrates an exemplary functional configuration of an access supporting device of the embodiment of the present invention.

FIG. 4 illustrates an exemplary functional configuration of an access supporting device of the embodiment of the present invention. Referring to FIG. 4, the access supporting device 10 includes an access support controlling part 11, an information managing part 12, a reporting part 13, and so on.

These parts are substantialized when the program installed in the access supporting device 10 is executed by the CPU 104. The access supporting device 10 further uses a client information storing part 14, an access destination information storing part 15, and so on. These memory parts can be substantialized by using the auxiliary memory device 102 or a memory device or the like connected through the network.

The access support controlling part 11 performs a process for mediating an access to the apparatus information stored in the information managing apparatus 21. Referring to FIG. 4, the access support controlling part 11 includes a request receiving part 111, an access part 112, a request sending part 113, and so on. The request receiving part 111 receives an access request to the apparatus information. The access part 112 requests the information managing apparatus 21 storing the apparatus information, which is an object to be accessed, to operate the apparatus information in response to the access request. The request sending part 113 sends a result of processing, which relates to the operation of the apparatus information performed in response to the access request, to the source of access request.

The information managing part 12 manages information necessary for a process performed by the access support controlling part 11. The information managing part 12 determines the data center 20, to which the information managing apparatus 21 storing the apparatus information, being an object of accessing, belongs. This data center 20 is determined based on the attribute information (hereinafter, referred to as "client information") of the clients stored in the information storing part 14 and the information stored in the access destination information storing part 15. The reporting part 13 reports an update of the apparatus information to the destination of the report in a case where it is necessary to report the update of the apparatus information by operating the apparatus information in response to the access request to a destination of the report other than the source of the access request.

FIG. 5 illustrates an exemplary functional configuration of an electronic apparatus 50 of the embodiment of the present invention. Referring to FIG. 5, the electronic apparatus 50 includes an access requesting part 51, an apparatus controlling part 52, or the like. The access requesting part 51 controls communications with the access supporting device 10. For example, the access requesting part 51 uploads the apparatus information of the electronic apparatus 50 to the access supporting device 10. The apparatus controlling part 52 controls the electronic apparatus 50.

FIG. 5 illustrates an exemplary functional configuration of the electronic apparatus 50 in the user environment E2. For example, the electronic apparatus 50, which does not directly communicate with the access supporting device 10 such as the electronic apparatus 50 in the user environment E1 or the user environment E3 may not include the access requesting part 51. It is sufficient that the apparatus managing apparatus 60 in the user environment E1 or the PC 70 in the user environment E3 has the access requesting part 51.

Figure 6:
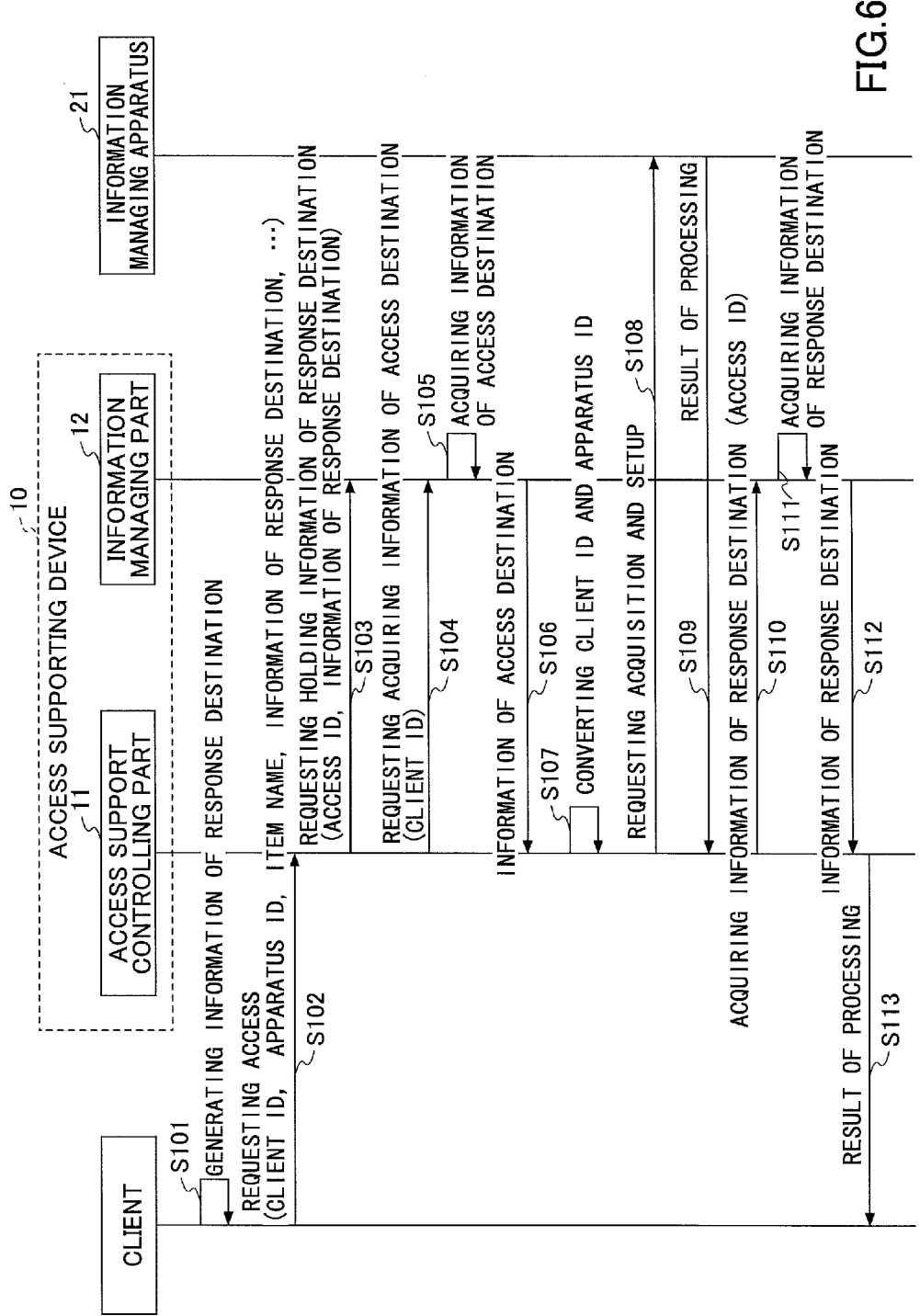
FIG. 6 is a sequence diagram for explaining an exemplary basic procedure for accessing apparatus information through an access supporting device.

Hereinafter, the procedure performed by the information processing system 1 is described. FIG. 6 is a sequence diagram for explaining an exemplary basic procedure for accessing apparatus information using the access supporting device 10. Referring to FIG. 6, "client" is a device requesting access to the apparatus information using the access supporting device 10. Within the embodiment, the apparatus managing apparatus 60 in the client environment E1, the electronic apparatus 50 in the client environment E2, the PCs 70a and 70b in the client environment E3, the apparatus monitoring device 31, the serviceman terminal 40, and so on may be the client.

In step S101, the client generates the information of response destination in step S101. The information of response destination includes identification information of a response destination of a result of processing, which is obtained as a result of accessing the apparatus information performed by the access supporting device 10 in response to a request from the client, a method of accessing the response destination, or the like. As to be described later, the result of processing in response to the request from the client is sent asynchronously in response to the request. Therefore, the access supporting device 10 needs to positively send the result of processing. Therefore, the client generates the information of response destination in order to report the identification information of the response destination, a method of accessing the response destination, or the like to the access supporting device 10.

The information of response destination includes, for example, a communication protocol, address information corresponding to the communication protocol, or the like. For example, in a case where the communication protocol is HyperText Transfer Protocol (HTTP), the address information is a uniform resource locator (URL). Further, in a case where the communication protocol is an electric mail, the address information is a mail address. Further, in a case where the communication protocol is File Transfer Protocol (FTP), the address information is an IP address.

Basically, the client exists at the response destination to the access request. In a case where the information of response destination is previously generated and stored on a file or the like, it is sufficient that the generated information of response destination is obtained in step S101.

Subsequently, the client sends the access request for requesting access to the apparatus information to the access supporting device 10 in step S102. The access request is particularly an acquisition request for requesting to acquire the apparatus information, a setup request for requesting to set up the apparatus information, or the like. The access request designates a client ID related to the apparatus information as an object of access, an apparatus ID, an item name, the information of the response destination generated in step S101, or the like. The item name is to identify items (parameters) forming the apparatus information. In a case where a program is included in the apparatus information, the program name of this program may be the item name. In a case where the access request is the setup request, a setup value for the item corresponding to the designated item name may be designated.

The access request is received by the request receiving part 111 of the access support controlling part 11. The request receiving part 11 returns a response to the client in response to the receipt of the access request. Said differently, before the processing in response to the access request, the response to the client is returned. As a result, the client is released from a wait state of the response without waiting a completion of processes to follow. Further, since the response is returned before performing a process corresponding to the access request, it is possible to prevent an occurrence of a situation where the client sends the access request again when a connection with the client is cut off by a communication failure or the like.

On the other hand, the request receiving part 111 requests the information managing part 12 to hold the information of response destination designated in the access request in response to the receipt of the access request in step S103.

The identification information (hereinafter, referred to as an "access ID"), which is allocated for each access request from the client, is designated in this request. The information managing part 12 associates the access ID designated in the request with the information of response destination, and stores these in, for example, the memory device 103.

Subsequently, the access part 112 requests the information managing part 12 to acquire the address information of the access destination in step S104. In this request, the client ID designated in the access request is designated. Information of the access destination is identification information or the like of the data center 20, to which the information managing apparatus 21 storing the apparatus information as the object of the access request belongs.

The information managing part 12 acquires information of access destination corresponding to the designated client ID in response to this request in step S105. Specifically, the information managing part 12 acquires the client information associated with the client ID from the client information storing part 14.

FIG. 7 illustrates an exemplary configuration of the client information storing part 14. Referring to FIG. 7, the client information storing part 14 stores client information such as a name, an address, a telephone number, a mail address, or the like. The name is an identification name of the client. For example, if the client is a company, the company name of the company may be the name. The address is the address of the client. The telephone number is a telephone number of the client. The mail address is a mail address of the client.

The information managing part 12 collates the acquired client information with information stored in the access destination information storing part 15 thereby acquiring the information of access destination.

FIG. 8 illustrates an exemplary structure of the access destination information storing part 15. Referring to FIG. 8, the access destination information storing part 15 stores a data center name, address information, or the like in association with an address keyword and a long-distance code keyword.

The address keyword is a keyword for the address of the client information. A long-distance code keyword is a keyword for the telephone number of the client information. The data center name is the name of the data center 20 corresponding to the client information, in which the address keyword is contained in the "address" and the long-distance code keyword is contained in the "telephone number". The address information is address information of the data center corresponding to the data center name. Referring to FIG. 8, a Uniform Resource Locator (URL) is employed as the address information. However, the address information may be expressed by a type corresponding to a protocol to be used. Further, in a case where a method of accessing a communication protocol is different for each data center 20, information related to the access method may be stored in each of the data centers.

The information managing part 12 acquires the data center name and the address information, which are stored in a record whose address and telephone number of the client information corresponding to the client ID include the address and the long-distance code keyword, respectively, as the information of access destination. The information managing part 12 returns the information of access destination to the access part 112 in step S106. Said differently, the information managing apparatus 21 belonging to the data center 20, which is related to the information of access destination, is determined as the access destination.

The corresponding information between the client and the data center 20 may be managed by a different mode. For example, the data center name and the address information may be stored in the client information storing part 14 in association with the client ID.

Subsequently, the access part 112 converts the client ID and the apparatus ID based on a predetermined converting rule in step S107. The converting rule is not specifically limited. However, it is preferable to be a converting rule where a value before the conversion is difficult to assume based on the value after the conversion. The object of the conversions of the client ID and the apparatus ID is to make it difficult to specify the client and the electronic apparatus 50 in the apparatus information managed by the data center 20. For example, the conversion may be performed by encryption. In a case where the access request is the setup request, the access support controlling part 11 may encrypt a setup value. Said differently, a part or all of the apparatus information stored in the data center 20 may be encrypted.

Subsequently, the access part 112 sends an operation request (an acquisition request or a setup request) of the apparatus information corresponding to the access request requested by the client to the information managing apparatus 21 in step S108. The destination of the operation request is specified based on the address information contained in the information of access destination acquired in step S106. Further, the client ID, the apparatus ID, the item name, and so on are designated in the operation request. If the operation request is a setup request, a setup value is also designated.

Subsequently, the information managing apparatus 21 operates the item corresponding to the item name in the apparatus information specified using the client ID and the apparatus ID, which are designated in the operation request.

FIG. 9 illustrates an exemplary management mode of the apparatus information in the information managing apparatus 21. As illustrated in FIG. 9, the information managing apparatus 21 stores the apparatus information of the electronic apparatus 50 specified by the apparatus ID in association with the client ID and the apparatus ID. Within the embodiment, the apparatus information corresponding to the electronic apparatus 50 is specified by the client ID and the apparatus ID.

If the operation corresponding to the operation request is an acquisition, the value of the item related to the designated item name among the apparatus information specified by the client ID and the apparatus ID is acquired. If the operation corresponding to the operation request is a setup, the setup value designated to the item corresponding to the designated item name is set among the apparatus information specified by the client ID and the apparatus ID.

Values of a plurality of items may be acquired or set up at once. In this case, the item names and so on of the plurality of items may be designated in the access request from the client as an item of the object to be accessed.

Subsequently, the information managing apparatus 21 returns the result of processing to the operation request to the access part 112 in step S109. If the operation corresponding to the operation request is an acquisition, the acquired apparatus information is returned as the result of processing, for example. If the operation corresponding to the operation request is a setup, the information indicative of a success or a failure of the setup is returned as the result of processing, for example. In a case where the apparatus information is contained in the result of processing, the access part 112 performs a reverse conversion of the client ID and the apparatus ID, which are converted in step S107. As a result, the client ID and the apparatus ID becomes a value understandable by the client and the electronic apparatus 50.

Subsequently, the request sending part 113 of the access support controlling part 11 requests the information managing part 12 to acquire the information of response destination while designating the access ID corresponding to the access request currently to be processed in step S110. The information managing part 12 is associated with the designated access ID and returns the information of response destination, which is stored in, for example, the memory device 103 to the request sending part 113 in step S112. The request sending part 113 sends the result of processing, which is returned in step S109, using an access method indicated by the information of response destination 113 to the response destination indicative of the information of response destination in step S113.

For example, in the process where the electronic apparatus 50 or the apparatus managing apparatus 60 uploads the apparatus information, the client in FIG. 6 corresponds to the apparatus managing apparatus 60 in the client environment E1, the multifunction peripheral 50e, the printer 50f, and the projector 50e in the client environment E2, or the access requesting part 51 of the PC 70a or 70b in the client environment E3. In this case, the access request in step S102 is the setup request. The client ID and the apparatus ID, which are designated in this setup request, is the client ID and the apparatus ID for the apparatus related to the apparatus information to be uploaded. Further, the apparatus information to be uploaded may be designated as a setup value. Further, address information, an access method, and so on of the electronic apparatus 50, the apparatus managing apparatus 60, or the PC 70 are designated as the information of response destination. As a result, this setup value is set to the apparatus information, which corresponds to the client ID and the apparatus ID and is stored in the information managing apparatus 21.

In a case where the apparatus managing apparatus 60 in the client environment E1 uploads the apparatus information, the apparatus information designated in the access request (the setup request) in step S102 is previously collected and managed by the database of the apparatus managing apparatus 60. Further, in a case where the PC 70 in the client environment E3 uploads the apparatus information, the apparatus information designated in the access request (the setup request) in step S102 is caused by a predetermined program to acquire in the PC 70 through the USB.

The upload of the apparatus information may be regularly performed or may be performed when the apparatus information is updated. Further, the apparatus information to be uploaded may be a difference from the uploaded apparatus information. Said differently, not all of the apparatus information but a portion of the apparatus information different from the apparatus information, which is stored in the information managing apparatus 21, may be uploaded.

On the other hand, in the process where the apparatus monitoring device 31 or the serviceman terminal 40 acquires apparatus information of a specific electronic apparatus 50, the client in FIG. 6 is the apparatus monitoring device 31 or the serviceman terminal 40. In this case, the access request in step S102 is the acquisition request. The client ID, the apparatus ID, and the item name related to the apparatus information to be acquired are designated in the acquisition request. Further, the address information, the access method, and so on of the electronic apparatus 50 or the apparatus managing apparatus 60 are designated as the information of response destination. As a result, a value of the item related to the item name among the apparatus information, which is stored by the information managing apparatus 21 in association with the client ID and the apparatus ID, is returned to the apparatus monitoring device 31 or the serviceman terminal 40.

Figure 10:
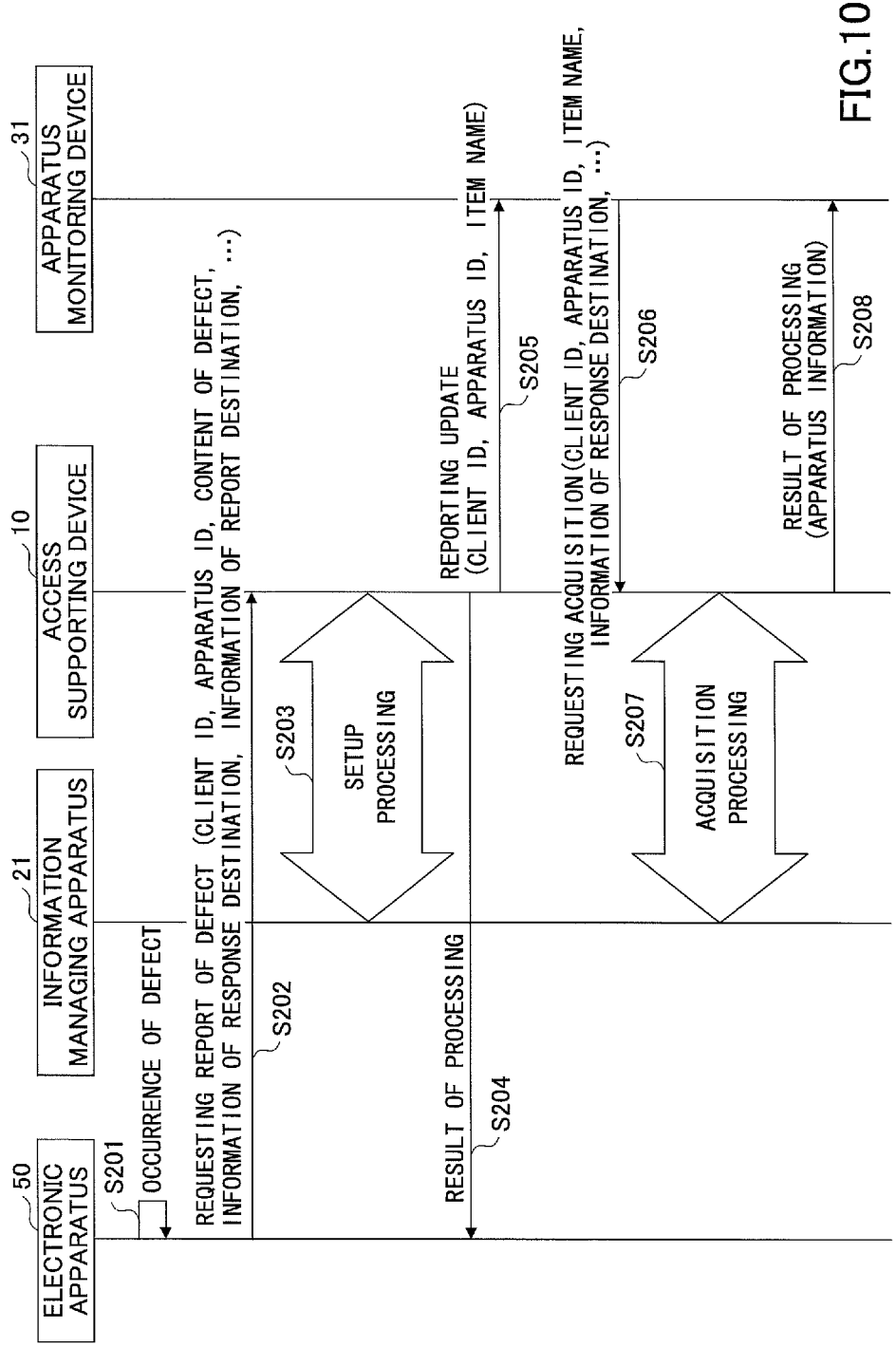
FIG. 10 is a sequence diagram for explaining an exemplary processing procedure performed when a defect occurs in an electronic apparatus.

Subsequently, an exemplary access to the apparatus information under a specific situation is described. FIG. 10 is a sequence diagram for explaining an exemplary processing procedure performed when a defect occurs in an electronic apparatus 50. The electronic apparatus 50 in FIG. 10 corresponds to the electronic apparatus in the client environment E2.

When a defect is detected in the electronic apparatus 50 in step S201, the access requesting part 51 of the electronic apparatus 50 sends a defect reporting request for requesting a report of the defect to the access supporting device 10 in step S202. The client ID, the apparatus ID, a content of the defect, information of a response destination, information of a report destination, and so on are designated in the defect reporting request. The content of the defect is an item name of and a value of an item whose value changes in response to the occurrence of the defect among items forming the apparatus information. For example, as to an item of "status", if the value of "status" is "error number <N>", where N is a number, "status" and "error number <N>" are included in the content of the defect. The error number is exemplary information indicative of the content of the defect. Or the entire apparatus information at a time of generating the defect may be the content of the defect. The defect is specifically determined when the condition of the electronic apparatus 50 is defined as being the defect. Therefore, the condition defined as being the defect may be appropriately determined in response to operations.

The information of response destination is as described in FIG. 6. The information of report destination includes identification information of a report destination of the content of the defect, a method of accessing the report destination, and so on. The configuration of the information of report destination may be similar to that of the information of response destination. Within the embodiment, the identification information of the apparatus monitoring device 31 and the method of accessing the apparatus monitoring device 31 are contained in the information of report destination. For example, each electronic apparatus 50 including the access requesting part 51 may store the identification information of the apparatus monitoring device 31 and method of accessing the apparatus monitoring device 31.

If the defect reporting request is received by the request receiving part 111 of the access support controlling part 11, the access part 112 performs a process in response to the defect reporting request. Here, the type of the access of defect report is classified to the setup. Therefore, in step S203, the setup processing of the apparatus information is performed in a processing procedure similar to steps S103 to S112 in FIG. 6. Said differently, the apparatus information related to the content of the defect designated in the defect reporting request is set to the information managing apparatus 21 of the data center corresponding to the client ID designated in the defect reporting request. More specifically, among the apparatus information stored in the information managing apparatus 21, pieces of the apparatus information corresponding to the client ID and the apparatus ID are overwritten by pieces of the apparatus information related to the content of the defect.

Subsequently, the request sending part 113 sends a result of processing to the electronic apparatus 50 based on the information of response destination designated in the defect reporting request in step S204.

Subsequently, the reporting part 13 of the access supporting device 10 sends an update report for reporting an update of the apparatus information, in which the client ID, the apparatus ID, and the item name are designated, to the apparatus monitoring device 31 based on the information of the report destination designated in the defect reporting request in step S205. The item name relates to the content of the defect designated in the defect reporting request.

The apparatus monitoring device 31 sends an acquisition request for acquiring the apparatus information to the access supporting device 10 in response to a receipt of the update report for the apparatus information in step S206. The client ID, the apparatus ID, and the item name related to the update report are designated in this acquisition request. Further, information of response destination indicating the apparatus monitoring device 31 as the response destination is also designated in the acquisition request.

In response to the acquisition request, by a processing procedure similar to steps S103 to S112 in FIG. 6, the apparatus information specified based on the client ID, the apparatus ID, and the item name, which are designated in the acquisition request, are acquired from the information managing apparatus 21 in step S207. Subsequently, the request sending part 113 sends the acquired apparatus information to the apparatus monitoring device 31 based on the information of response destination designated in the acquisition request in step S208.

The apparatus monitoring device 31, which receives the apparatus information, outputs the apparatus information in, for example, a predetermined output type. As a result, a serviceman in the apparatus supporting center 30 checks an occurrence of the defect of the electronic apparatus 50 and can start necessary work. The predetermined output type is, for example, displaying on a display device, printing in an image forming apparatus, sending to the serviceman terminal 40, or the like.

Referring to FIG. 10, a process performed by the electronic apparatus 50 may be performed by the apparatus managing apparatus 60 in the user environment E1 or the PC 70 in the user environment E3.

Figure 11:
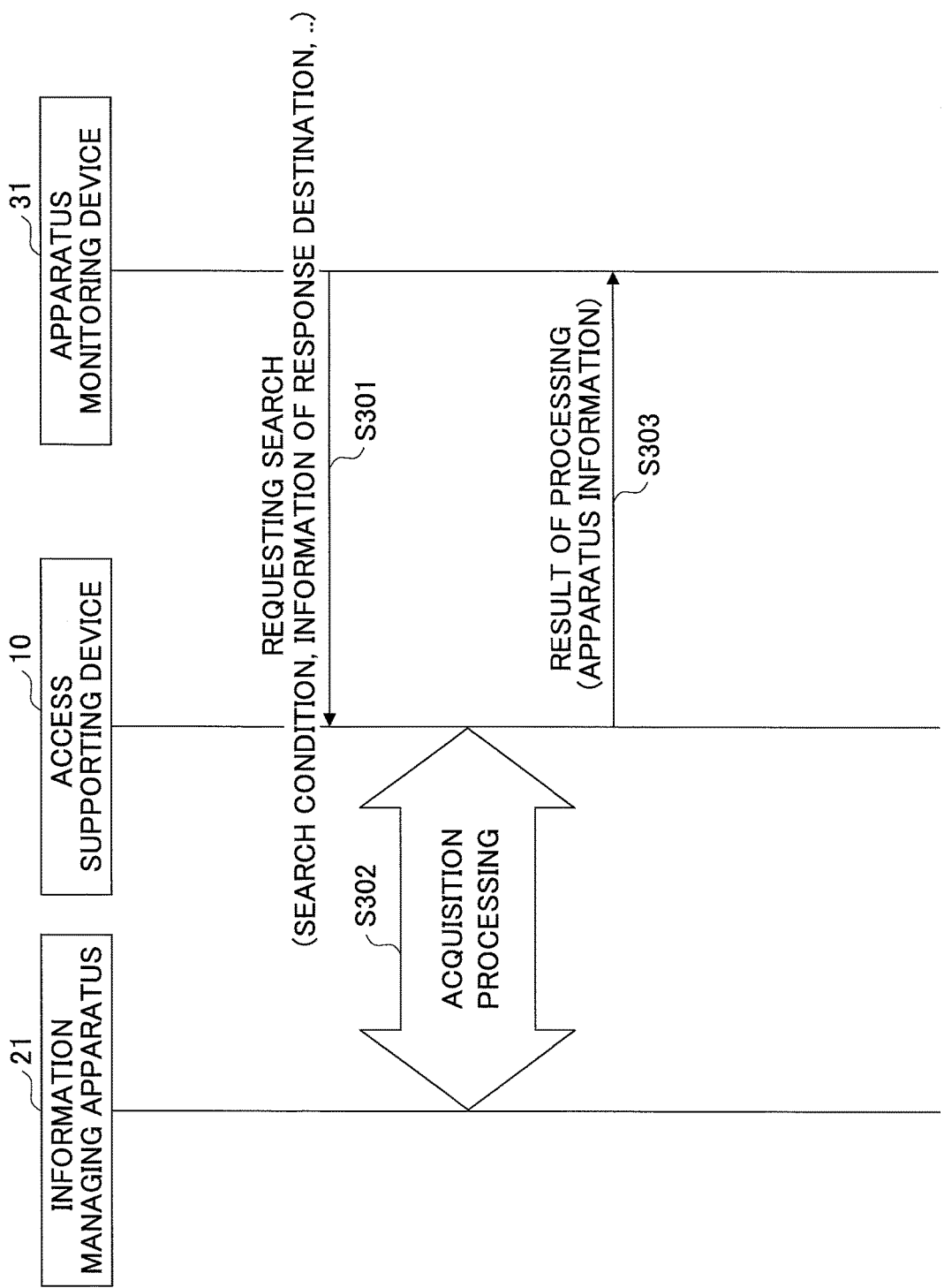
FIG. 11 is a sequence chart for explaining an exemplary processing procedure for searching apparatus information.

Subsequently, searching of the apparatus information by the serviceman in a support center is described. FIG. 11 is a sequence chart for explaining an exemplary processing procedure for searching the apparatus information.

For example, in response to an instruction input from the serviceman, the apparatus monitoring device 31 sends a search request for requesting a search of the apparatus information to the access supporting device 10 in step S301. A search condition, information of response destination indicating the apparatus monitoring device 31 as the response destination, and so on are designated in the search request. The search condition may be a conditional expression about a client ID, the apparatus ID, the item name, or the like. However, in a case where the apparatus information of all apparatuses of a specific client is searched, the conditional expression about the apparatus ID may not be designated. Further, in a case where the apparatus information of all apparatuses of all clients is searched, the conditional expressions about the client ID and the apparatus ID may not be designated. Further, in a case where the item to be searched is not specified among the items forming the apparatus information, the conditional expression about the item name may not be designated.

The search request for requesting to search the apparatus information is classified as the acquisition as the type of the access to the apparatus information. Therefore, in response to the search request for searching the apparatus information, the apparatus information specified based on the search condition designated in the search request is acquired by the information managing apparatus 21 using a processing procedure similar to steps S103 to S112 in step S302. When the client ID is not designated in the search condition, in a case where a plurality of client IDs satisfies the searching condition, steps S104 to S109 are performed for each client ID.

Subsequently, the request sending part 113 sends the acquired apparatus information to the apparatus monitoring device 31 based on the information of response destination designated in the search request in step S303. As a result, the serviceman can know desired apparatus information.

Referring to FIG. 11, the processes performed by the apparatus monitoring device 31 may be performed by the serviceman terminal 40.

Subsequently, an exemplary setup change of the apparatus information of the electronic apparatus 50 for remotely changing the setup with the apparatus monitoring apparatus 31. FIG. 12 is a sequence diagram for explaining the exemplary processing procedure for remotely changing a setup of the apparatus information of the electronic apparatus. For example, when a user in a client environment request the serviceman to change a setup of a value of an item forming the apparatus information of a certain electronic apparatus 50 a process illustrated in FIG. 12 is performed. The electronic apparatus 50 illustrated in FIG. 12 corresponds to the electronic apparatus 50 in the user environment E2.

For example, in response to an instruction input from the serviceman, the apparatus monitoring device 31 sends a setup change request for requesting to change a setup of the apparatus information to the access supporting device 10 in step S401. The client ID, the apparatus ID, the item name, the setup value, information of response destination indicating the apparatus monitoring device 31 as a response destination, information of report destination, and so on are designated in this setup change request. The client ID is a client ID of a client, to which the electronic apparatus 50 whose apparatus information is to be changed. The apparatus ID is an apparatus ID of the electronic apparatus 50 whose apparatus information is to be changed. The item name is of the name of the item, which is to be changed. The setup value is a value after the change. The information of report destination includes identification information of a report destination of the setup change of the apparatus information, a method of accessing the report destination, and so on. The configuration of the information of report destination may be similar to that of the information of response destination. Here, the identification information of the electronic apparatus 50 whose apparatus information is to be changed and the method of accessing the electronic apparatus 50 may be contained in the information of report destination.

The setup change request for requesting to set up the apparatus information is classified as the setup as the type of the access to the apparatus information. Therefore, in response to the setup change request for requesting to change the setup of the apparatus information, the apparatus information specified based on the client ID, the apparatus ID, and the item name, which are designated in the setup change request, is set to the information managing apparatus 21 in step S402. More specifically, in the apparatus information, which is stored in the information managing apparatus 21 corresponding to the client ID, and is associated with the client ID and the apparatus ID, the value of the item name designated in the setup change request is changed to a setup value designated in the setup change request.

Subsequently, the request sending part 113 sends a result of processing to the apparatus monitoring device 31 based on the information of response destination designated in the setup change request in step S403.

Subsequently, the reporting part 13 of the access supporting device 10 sends a setup change report for reporting the setup change of the apparatus information, in which the apparatus ID and the item name are designated, to the electronic apparatus 50 related to the information of the report destination designated in the setup change request in step S404.

The access requesting part 51 of the electronic apparatus 50, which receives the setup change report, sends an acquisition request for requesting to acquire the apparatus information to the access supporting device 10 in step S405. The apparatus ID and the item name, which are designated in the acquisition request, the client ID related to the electronic apparatus 50, and information of a response destination, which is the electronic apparatus 50, are designated in the acquisition request.

In response to the acquisition request, by a processing procedure similar to steps S103 to S112 in FIG. 6, the apparatus information specified based on the client ID, the apparatus ID, and the item name, which are designated in the acquisition request, are acquired from the information managing apparatus 21 in step S406. Subsequently, the request sending part 113 sends the acquired apparatus information to the electronic apparatus 50 related to the information of response destination, which is designated in the acquisition request, in step S407.

Subsequently, the apparatus controlling part 52 of the electronic apparatus 50 sets up the received apparatus information to the own electronic apparatus 50. Said differently, a value of the item being the object of the setup change is updated.

The apparatus information undergoing the setup change may be a program installed in the electronic apparatus 50. Said differently, an installation of a new program or an existing program to the electronic apparatus 50 may be performed using the processing procedure illustrated in FIG. 12.

Referring to FIG. 12, a process performed by the electronic apparatus 50 may be performed by the apparatus managing apparatus 60 in the user environment E1 or the PC 70 in the user environment E3. In this case, the apparatus managing apparatus 60 or the PC 70 may set up the apparatus information received in step S407 to the electronic apparatus 50 related to the apparatus ID designated in the setup change report in step S404.

As described above, according to the embodiment of the present invention, an access source in accessing the apparatus information, which is stored in the data center 20 (the information managing apparatus 21), can access the apparatus information even when the access source cannot specify (know) the data center 20 where the apparatus information to be accesses is managed.

Therefore, it is possible to reduce the work of the serviceman such as checking the access destinations for each client or switching the access destinations for each client. Said differently, it is possible to support the operation of the information in the electronic apparatus 50 through the network.

The part corresponding to the data center 20 is not necessarily determined by the client ID. For example, the data center 20 corresponding to the apparatus ID may differ with respect to the apparatus ID.

Within the embodiment of the present invention, the access supporting device 10 is an example of the information processing apparatus. The apparatus monitoring system 1 is an example of the information processing system. The request receiving part 111 is an example of a receiving part. The information managing part 12 is an example of a determining part. The access part 112 is an example of a requesting part. The reporting part 13 is an example of a sending part. The client ID or the client ID and the apparatus ID are an example of identification information of apparatus information to be operated. The client information storing part 14 is an example of a first memory part. The access destination information storing part 15 is an example of a second memory part. The client, the client environments E1 to E3, or the like is an example of a request source requesting to manage the apparatus information. The client ID is an example of request source identification information. The process corresponding to step S102 in FIG. 6 is an example of a receiving process. Step S105 is an example of a determining process. Step S108 is an example of a requesting process.

According to the embodiment of the present invention, it is possible to support the operation of the information in the electronic apparatus through the network.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing apparatus has been described in detail, it should be understood that various changes, substitutions, and alterations could be made thereto without departing from the spirit and scope of the invention.

This application is based upon and claims the benefit of priority of the prior Japanese Patent Application No. 2012-254221, filed on Nov. 20, 2012, the entire contents of which are incorporated herein by reference.

What is claimed is:

1. An information processing apparatus connected to multiple data centers used by multiple clients, which manage apparatus information of an electronic apparatus, through a network, the information processing apparatus comprising a circuitry configured to process steps of:
   receiving an access request requesting to access the apparatus information;
   determining the data center from among the multiple data centers corresponding to request source model name associated with request source identification information for each request source, which requests each data center to manage the apparatus information, based on the request source model name corresponding to the data center;
   generating another access request of the apparatus information corresponding to the access request to the data center determined as corresponding to the request source model name associated with request source identification information for each request source;
   converting the identification information according to a predetermined conversion rule so that the identification information before conversion is not apparent from the converted identification information; and requesting the determined data center to access the apparatus information in conformity with the access request by designating the converted identification information.

2. The information processing apparatus according to claim 1, the circuitry further configured to process steps of:
acquiring from a memory the request source model name corresponding to the apparatus information, which is to be accessed and forms the identification information; and
wherein the memory stores the request source model name of the request source in association with the request source identification information.

3. The information processing apparatus according to claim 2, the circuitry further configured to process steps of:
determining the data center from among the multiple data centers corresponding to a character string contained in the acquired request source attribute information, based on a relationship between the character string and the request source model name and each data center.

4. The information processing apparatus according to claim 1, the circuitry further configured to process steps of:
receiving information indicative of a content of a defect of the electronic apparatus,
requesting the determined data center to access the apparatus information in conformity with the content of the defect, and
sending the apparatus information accessed in conformity with the content of the defect to a predetermined apparatus.

5. The information processing apparatus according to claim 1, the circuitry further configured to process steps of:
receiving a change request requesting to change the apparatus information,
requesting the determined data center to change the apparatus information related to the change request, and
sending the changed apparatus information to the electronic apparatus related to the changed apparatus information.

6. The information processing apparatus according to claim 1, wherein
the identification information is converted by encrypting the identification information.

7. A method of processing information by an information processing apparatus connected to multiple data centers used by multiple clients, which manage apparatus information of an electronic apparatus through a network, the information processing apparatus comprising a circuitry configured to process steps of:
receiving an access request requesting to access the apparatus information;
determining the data center from among the multiple data centers corresponding to request source model name associated with request source identification information for each request source, which requests each data center to manage the apparatus information, based on the request source model name corresponding to the data center;
generating another access request of the apparatus information corresponding to the access request to the data center determined as corresponding to the request source model name associated with request source identification information for each request source;
converting the identification information according to a predetermined conversion rule so that the identification information before conversion is not apparent from the converted identification information; and
requesting the determined data center to access the apparatus information in conformity with the access request by designating the converted identification information.

8. The method of processing information according to claim 7, wherein
the identification information is converted by encrypting the identification information.

* * * * *